US010183430B2

(12) United States Patent
Klaska et al.

(10) Patent No.: US 10,183,430 B2
(45) Date of Patent: Jan. 22, 2019

(54) METHOD FOR INJECTION MOLDING OF THERMOPLASTIC POLE PARTS, AND MOLD FOR PRODUCING THE SAME

(71) Applicant: ABB Technology AG, Zürich (CH)

(72) Inventors: Arne Klaska, Düsseldorf (DE); Dietmar Gentsch, Ratingen (DE); Dariusz Bednarowski, Cracow (PL); Lukasz Malinowski, Cracow (PL); Wenkai Shang, Ratingen (DE)

(73) Assignee: ABB Schweiz AG, Baden (CH)

( * ) Notice: Subject to any disclaimer, the term of this patent is extended or adjusted under 35 U.S.C. 154(b) by 761 days.

(21) Appl. No.: 14/522,082

(22) Filed: Oct. 23, 2014

(65) Prior Publication Data

US 2015/0042003 A1 Feb. 12, 2015
US 2016/0243740 A2 Aug. 25, 2016

Related U.S. Application Data

(63) Continuation of application No. PCT/EP2013/001212, filed on Apr. 23, 2013.

(30) Foreign Application Priority Data

Apr. 23, 2012 (EP) .................................. 12002833

(51) Int. Cl.
*B29C 45/00* (2006.01)
*B29C 45/14* (2006.01)
(Continued)

(52) U.S. Cl.
CPC .......... *B29C 45/2708* (2013.01); *B29C 45/14* (2013.01); *B29C 45/14549* (2013.01);
(Continued)

(58) Field of Classification Search
CPC ............ B29C 45/2703; B29C 45/2708; B29C 45/2709
See application file for complete search history.

(56) References Cited

U.S. PATENT DOCUMENTS 6,767,486 B2 * 7/2004 Doughty ................. B29C 45/27
264/328.8
2007/0200279 A1 * 8/2007 Yui ...................... B29C 45/2708
264/328.1
(Continued)

FOREIGN PATENT DOCUMENTS

CN 101268536 A 9/2008
GB 1 506 851 A 4/1978
(Continued)

OTHER PUBLICATIONS

International Search Report (PCT/ISA/210) dated Jul. 29, 2013, by the European Patent Office as the International Searching Authority for International Application No. PCT/EP2013/001212.
(Continued)

*Primary Examiner* — Jacob T Minskey
*Assistant Examiner* — Cedrick S Williams
(74) *Attorney, Agent, or Firm* — J. Bruce Schelkopf; Taft Stettinius & Hollister LLP

(57) ABSTRACT

A method for injection molding of thermoplastic pole parts utilizes a mold to fix at least one vacuum interrupter and contact terminals during a molding process. At least one injection opening or gate for injection of thermoplastic material is formed into the mold. The mold is applied with multiple injection openings at least along its long axis, for injection of hot thermoplastic material, and the injection openings or gates can be steered in such a way that they inject thermoplastic material simultaneously or with a defined time dependent injection pattern. This process alleviates the issue of a pressure gradient along the long axis of (Continued)

the molded pole part, shortens process times, and achieves a homogenous dissipation of material during the molding process.

4 Claims, 2 Drawing Sheets

(51) Int. Cl.
    *B29C 45/16*     (2006.01)
    *B29C 45/27*     (2006.01)
    *H01H 33/662*     (2006.01)
    *B29K 101/12*     (2006.01)
    *B29K 105/12*     (2006.01)
    *B29L 31/34*     (2006.01)

(52) U.S. Cl.
    CPC .. *B29C 45/14639* (2013.01); *B29C 45/14836* (2013.01); *B29C 45/2703* (2013.01); *H01H 33/66207* (2013.01); *B29C 45/1671* (2013.01); *B29C 2045/0027* (2013.01); *B29C 2045/0032* (2013.01); *B29C 2045/0089* (2013.01); *B29C 2045/279* (2013.01); *B29C 2045/2714* (2013.01); *B29C 2045/2716* (2013.01); *B29C 2045/2722* (2013.01); *B29K 2101/12* (2013.01); *B29K 2105/12* (2013.01); *B29L 2031/3481* (2013.01); *H01H 2033/6623* (2013.01)

(56) References Cited

U.S. PATENT DOCUMENTS

| | | | |
|---|---|---|---|
| 2007/0273060 A1 | 11/2007 | Doyle et al. | |
| 2008/0142485 A1* | 6/2008 | Gentsch | B29C 45/14639 218/118 |
| 2012/0234795 A1* | 9/2012 | Humpert | B29C 45/14639 218/118 |

FOREIGN PATENT DOCUMENTS

| | | |
|---|---|---|
| JP | 8-252838 A | 10/1996 |
| JP | 2001-179786 A | 7/2001 |
| WO | WO 98/39150 A2 | 9/1998 |
| WO | WO 03/057448 A1 | 7/2003 |

OTHER PUBLICATIONS

Written Opinion (PCT/ISA/237) dated Jul. 29, 2013, by the European Patent Office as the International Searching Authority for International Application No. PCT/EP2013/001212.

European Search Report (EPO Form 1507N) dated Sep. 24, 2012.

Chinese Office Action dated Feb. 24, 2016; Chinese Application No. 201380027552.5; ABB Technology AG; 30 pgs. (including translation).

* cited by examiner

METHOD FOR INJECTION MOLDING OF THERMOPLASTIC POLE PARTS, AND MOLD FOR PRODUCING THE SAME

RELATED APPLICATIONS

This application claims priority as a continuation application under 35 U.S.C. § 120 to PCT/EP2013/001212, which was filed as an International Application on Apr. 23, 2013 designating the U.S., and which claims priority to European Application 12002833.7 filed in Europe on Apr. 23, 2012. The entire contents of these applications are hereby incorporated by reference in their entireties.

FIELD

The present disclosure relates to a method for injection molding of thermoplastic pole parts, with the use of a mold in which at least one vacuum interrupter and contact terminals are fixed during the molding process, and with at least one injection opening/gate for injection of thermoplastic material into the mold, and to a mold for proceeding the same.

BACKGROUND INFORMATION

Injection molding of medium voltage pole parts, for example, to cover them with a thermoplastic housing, is well known. In contrast to the use of duroplastic material for a resin, the proceeding pressure for thermoplastic material during the molding is higher. An advantage of a thermoplastic housing is that the manufacture times are shorter than the manufacture times for epoxy resin. This is because epoxy resin needs longer curing periods and has slow temperature curves.

Thermoplastic material only has to become solid by cooling down.

Injection molding technology for thermoplastic pole parts is used only with a single injection gate or opening.

Furthermore, due to inlays which are sensitive to pressure such as vacuum-interrupters, for example, injection molding is only possible up to certain pressure limits.

The filling of a cavity depends on the behavior and the properties of thermoplastic materials, in scope of their resulting viscosity.

Drawbacks of known processes include the following:

The filling pressure decreases along the flow path to a low pressure at the end, caused by the viscosity of the thermoplastic material. This finally results in filling problems.

The maximum filling pressure inside the mold increases with the height of the pole part or the pole part arrangement along the flow path.

Geometric constraints require inhomogeneous wall thickness along the flow path, and therefore voids occur, which may also result in incomplete filling at dedicated pressures.

The introduction of geometric reinforcement elements such as fins for the strength and stiffness of a pole part is almost impossible due to the ineligible increase of cavity pressure.

Injection molding of material with increased viscosity is with that known technology not possible.

The manufacture time cycles for thermoplastic covered pole parts are quite short, so dynamic effects like the viscosity of the liquid hot thermoplastic material occur during the process.

SUMMARY

An exemplary embodiment of the present disclosure provides a method for injection molding of thermoplastic pole parts. The exemplary method includes utilizing a mold to fix at least one vacuum interrupter and contact terminals during a molding process, and forming at least one injection opening for injection of thermoplastic material into the mold. The exemplary embodiment also includes applying the mold with multiple injection openings or gates, or film-injection gates at least along its long axis, for injection of hot thermoplastic material. In addition, the exemplary embodiment includes positioning the injection gates to at least one of be steered and operated such that they inject the hot thermoplastic material one of (i) simultaneously and (ii) with a defined time dependent injection pattern.

An exemplary embodiment of the present disclosure provides a pole part which includes a mold for injection molding of thermoplastic pole parts. The mold fixes at least one vacuum interrupter and contact terminals of the pole part during a molding process. The exemplary pole part also includes a plurality of injection openings or gates for injection of thermoplastic material into the mold, the injection openings or gates being applied at least along a long axis of the pole part for injection of hot thermoplastic material. At least one of the injection openings or gates is applied with a steerable shutter.

BRIEF DESCRIPTION OF THE DRAWINGS

Additional refinements, advantages and features of the present disclosure are described in more detail below with reference to exemplary embodiments illustrated in the drawings.

DETAILED DESCRIPTION

Figure 1:
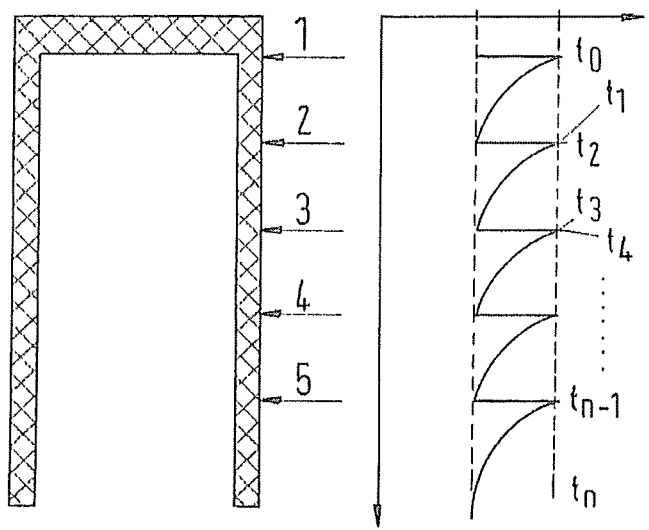
FIG. 1 illustrates a mold with several injection gates according to an exemplary embodiment of the present disclosure.

Exemplary embodiments of the present disclosure overcome the drawbacks noted above by providing a controlled pressure gradient along the long axis of the molded pole part. The exemplary embodiments of the present disclosure provide shorter process times as well as a homogenous dissipation of material during the molding process.

Exemplary embodiments of the present disclosure achieve the above-described solutions by providing a mold that is applied with multiple injection openings or gates or film-injection gates at least along the long axis of the mold of the pole part, for injection of hot thermoplastic material, such that injection gates can be steered in such a way that they inject thermoplastic material simultaneously or with a defined time dependent injection pattern.

In accordance with an exemplary embodiment, further injection gates are located at points in the mold having a non-flat topography. This enhances a complete filling without time loss also at a region with a complicated topography. This furthermore results in a better mechanical integrity as well as a better reduction of voids.

In accordance with an exemplary embodiment of the present disclosure, the injection openings are applied with shutters, by which the flux of injected hot thermoplastic material can independently be steared for each injection opening. Due to these shutters, each injection opening or gate can be steered in the optimal way, and with consideration of a pressure gradient along the flow path of thermoplastic material.

In accordance with an exemplary embodiment, the pressure in the injection openings or near to them are measured via pressure sensors in order to steer the injection of each injection opening, for example, steer each shutter according to a predetermined pressure gradient.

According to an exemplary embodiment, in order to enhance the mechanical and the dielectric behavior and to cause a reduction of voids of the pole part housing, the injected hot thermoplastic material is filled with particles or fibers, and one or more dedicated injection openings are applied with the hot thermoplastic material, in order to strengthen at least several regions of the pole part.

According to an exemplary embodiment, the injection gates are steered or driven via the shutter and the applied pressure in such a way that the direction of the resulting material flow in the mold during the molding process can be steered or optimized.

According to an exemplary embodiment, in order to use several material compounds, at least two gates are applied with different hot thermoplastic material, in order to implement a two or more compound molding during one molding process.

According to an exemplary embodiment, the mold is applied with multiple injection gates at least along the long axis of the pole part, for injection of hot thermoplastic material, and at least one of the injection gates is applied with a steerable shutter.

According to an exemplary embodiment, the shutter and/or the injection openings or gates are steered by steering means in which a pressure and or flux pattern is predetermined. As a result, the shutter and/or the injection openings or gates is/are configured to be steered by at least one of predetermined pressure and a predetermined flux pattern.

In accordance or with an exemplary embodiment, pressure sensors are located in or near the injection openings or gates, and the pressure sensor values are feed into the steering means, in order to steer the shutter of injectors via a predetermined time/pressure pattern.

In accordance with any of the exemplary embodiments described herein, film injection gates can be used. One of the advantages is that the thermoplastic pole parts for indoor applications utilize multiple injection gates, in order to reduce viscosity-dependant pressure gradient along the long axis of the mold, so that it results in more homogenous housing of the pole parts and improve filling of the mold.

The position of the injection openings or gates can be chosen to support a particular alignment of inlays in the mold.

FIG. 1 shows a mold according to an exemplary embodiment of the present disclosure, with several injections openings or gates along the long axis of the mold, which is also the flow path of the injected thermoplastic material. In FIG. 1, the mold is not shown inserted in the positioned vacuum interrupter, as such an illustration is not necessary to understand the features of the present disclosure.

The injection openings or gates 1, 2, 3, 4, 5 are applied in this case nearly equidistantly. But this is only an example, and the injection openings or gates need not be align in this way. For example, if regions of dense topography occur by given vacuum-interrupter- or inlay-construction, the gates can be arranged in a non-equidistant proximity (e.g., closer) than in other regions of the mold.

The effect of such an arrangement of injection openings or gates is shown on the right side of FIG. 1. The diagram shows the pressure gradient along the long axis or the flow path of the injected thermoplastic material.

It is clear that the decrease of pressure caused by the viscosity of the thermoplastic material can be limited by the distance to the next injection gate.

Figure 2:
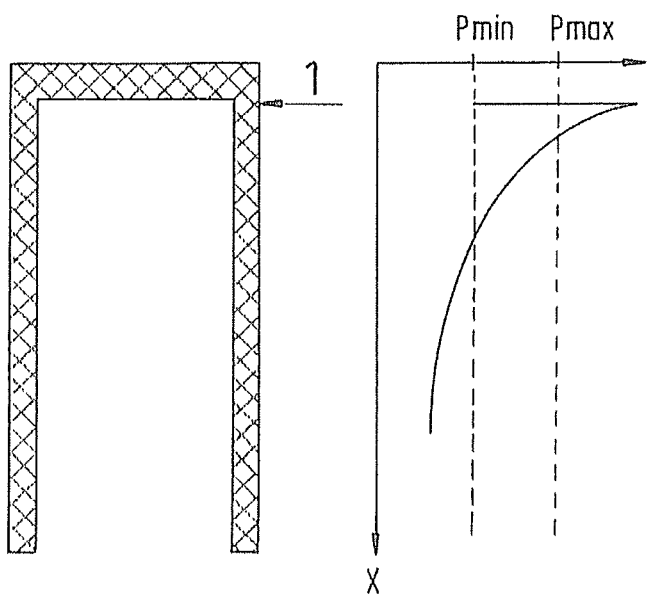
FIG. 2 illustrates a known configuration.

In comparison with FIG. 1, FIG. 2 shows the state of the art. FIG. 2 shows a mold with only one injection gate 1. It is clear that the pressure decreases along the flow path of the thermoplastic material.

Accordingly, the difference between the present disclosure and conventional techniques becomes clear from a comparison of FIG. 1 with FIG. 2.

Figure 3:
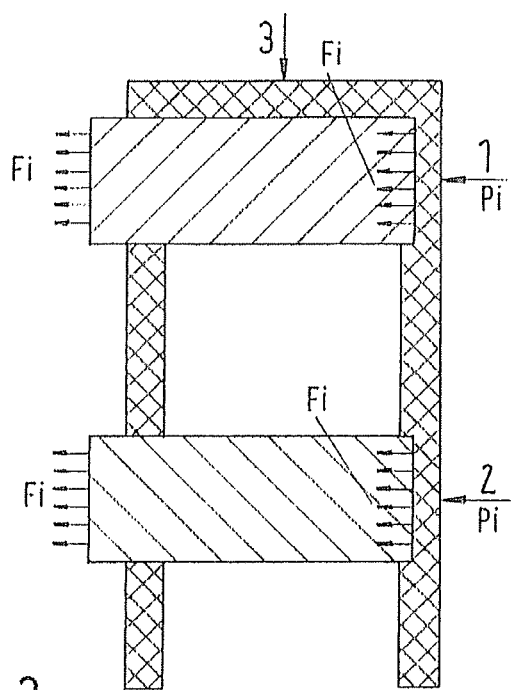
FIG. 3 illustrates a mold with additional use of inlays according to an exemplary embodiment of the present disclosure.

FIG. 3 shows an exemplary embodiment of the present disclosure having additional inlays in the mold. The additional inlays can be the electric terminals of the pole part, for example. Accordingly, the injection gates can be located such that they are positioned near to the inlays.

In accordance with the exemplary embodiment of FIG. 3, the injection gates 1, 2 are positioned such that a force $F_i$ is caused by injected material in that way and in that direction causes the inlay to be pushed into its predetermined end position. This gives a high performance in the sense of final measures and positioning of the manufacture of a pole part.

The following summarizes advantageous features resulting from the present disclosure.

An increased number of injection gates in the mold along the flow path is achieved.

A location of injection gates can be selected in such a way that a maximum filling pressure is reduced compared to single injection gate, and the flow of material is much more homogenous in the sense of high mechanical performance of the housing of the pole part. Furthermore, the control of maximum filling pressures is possible, in order to consider each pressure sensitive inlay in such a pole part. The control of a pressure profile along the flow path is also possible, at least to consider several topography of the inlays, or of the outer surface of the pole part housing.

An almost constant filling pressure is possible, which keeps filling pressure inside mold at a dedicated level.

An alignment of glass fiber around vacuum-interrupter optimized concerning dielectric and mechanical strength is possible also in case of influence of viscosity by such additives in the hot thermoplastic material.

Furthermore, the control of positions of weld lines by the selection of positions for opening further gates, th.m. injection before or after flow front arrives at injection gate, is provided, and a support of positioning, th.m. alignment to mold, or sealing, of inlays due to dedicated changes of filling direction is given by location of the injection gate beneficially on the opposite side of the inlay in the mold.

In addition, the use of a defined injection angle (e.g., 90°) versus an axial direction of the pole part, can be applied at one or more of the injection gates.

Thus, the present disclosure allows for the use of complex structure elements, possibly including reinforcement elements, fine structures, far projected fins for mechanical reinforcement of the pole part housing or increased creepage length, in this molding process as well.

Figure 4:
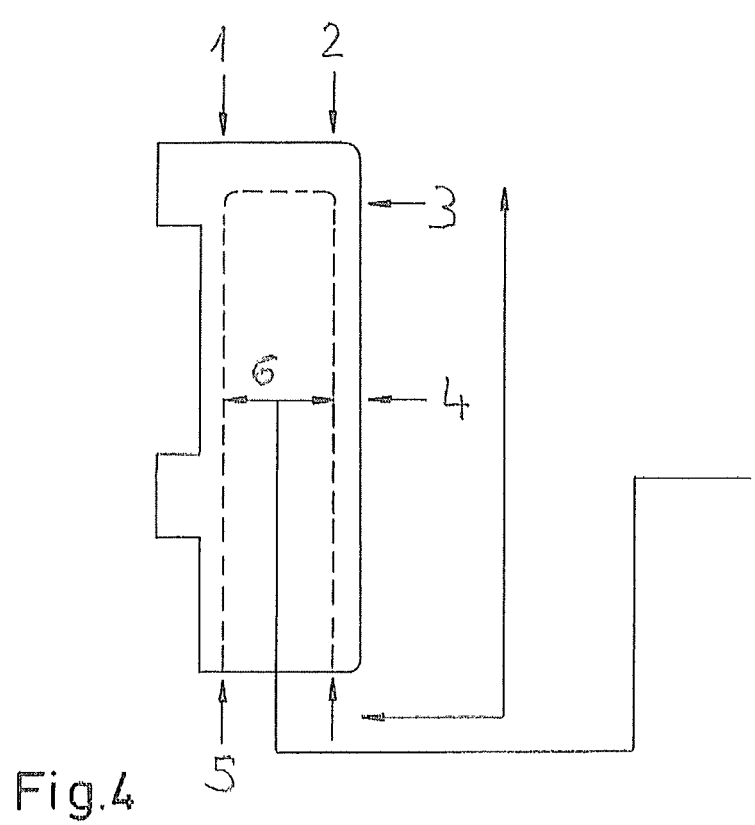
FIG. 4 illustrates a mold with the use of film injection gates, according to an exemplary embodiment of the present disclosure.

FIG. 4 shows schematically an exemplary embodiment of an implementation of the present disclosure (e.g., in case of a general or additional film injection method). Film injection gates 1, 2, 3, 4, 5, 6 can be applied from the inner and/or the outer side of the mold.

They can be driven from the top or bottom side or as well from the sidewall position or from the inner side of the so produced thermoplastic part. Thus, all injection gates are steered in that way, as described above.

While the present disclosure has been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art and practising the claimed disclosure, from a study of the drawings, the present disclosure, and the appended claims. In the claims, the word "comprising" or "including" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for injection molding of thermoplastic pole parts, the method comprising:
   utilizing a mold to fix at least one vacuum interrupter and contact terminals during a molding process;
   providing the mold with multiple injection openings at least along its long axis, for injection of hot thermoplastic material;
   positioning at least one of the injection openings behind one of the contact terminals, the injected hot thermoplastic material exerting force against the contact terminal to push the contact terminal away from the injection opening and into a final end position;
   positioning at least one of the injection openings along a surface of the mold transverse from the long axis;
   wherein the multiple openings are provided with different hot thermoplastic materials, in order to implement a two or more compound molding during one molding process, one of the hot thermoplastic materials being filled with particles or fibres;
   injecting the hot thermoplastic material filled with particles or fibres into the mold through at least one of the injection openings to strengthen at least one region of the pole part;
   positioning the injection openings along the long axis such that they inject the hot thermoplastic material with a defined time dependent injection pattern;
   providing the injection openings along the long axis with shutters, by which a flux of injected hot thermoplastic material can independently be steered for each injection opening;
   measuring pressure in at least one of the injection openings and locations near to the injection openings along the long axis by pressure sensors to steer the injection of each injection opening such that the thermoplastic flows through the multiple injection openings are steered along a continuous pressure gradient from opening to opening; and
   injecting the hot thermoplastic material at a previous opening sooner and with a same pressure than a following opening and so on, such that an injection pressure reaches an equal level of pressure along the multiple injection openings.

2. The method according to claim 1, comprising:
   locating further injection openings at points in the mold having a non-flat topography.

3. The method according to claim 1, wherein that the thermoplastic flows through the injection openings are steered via at least one of the shutters and a pressure applied in at least one of the injection openings, gates and locations near to the injection openings and gates such that a direction of material flow in the mold during the molding process can be steered.

4. The method according to claim 1, comprising:
   operating the injection of the hot thermoplastic material by at least partly using film injection gates from the inner or outer side of the produced thermoplastic part.

* * * * *